United States Patent
Cai et al.

(10) Patent No.: US 11,574,417 B2
(45) Date of Patent: Feb. 7, 2023

(54) PORTABLE DEVICE POSITIONING DATA PROCESSING METHOD AND APPARATUS, DEVICE, AND STORAGE MEDIUM

(71) Applicant: JINGDONG TECHNOLOGY INFORMATION TECHNOLOGY CO., LTD., Beijing (CN)

(72) Inventors: Xiaolong Cai, Beijing (CN); Chao Wang, Beijing (CN); Xinran Guo, Beijing (CN)

(73) Assignee: Jingdong Technology Information Technology Co., Ltd., Beijing (CN)

(*) Notice: Subject to any disclaimer, the term of this patent is extended or adjusted under 35 U.S.C. 154(b) by 0 days.

(21) Appl. No.: 17/757,150

(22) PCT Filed: Nov. 30, 2020

(86) PCT No.: PCT/CN2020/132929
§ 371 (c)(1),
(2) Date: Jun. 10, 2022

(87) PCT Pub. No.: WO2021/115154
PCT Pub. Date: Jun. 17, 2021

(65) Prior Publication Data
US 2022/0414929 A1 Dec. 29, 2022

(30) Foreign Application Priority Data
Dec. 11, 2019 (CN) .......................... 201911269684.4

(51) Int. Cl.
*G06T 7/73* (2017.01)
*G06T 7/66* (2017.01)
(Continued)

(52) U.S. Cl.
CPC ................ *G06T 7/75* (2017.01); *G01S 17/89* (2013.01); *G06T 7/344* (2017.01); *G06T 7/66* (2017.01);
(Continued)

(58) Field of Classification Search
CPC .. G06T 7/75; G06T 7/74; G06T 7/344; G06T 7/66; G06T 2207/10028; G01S 17/89
(Continued)

(56) References Cited

U.S. PATENT DOCUMENTS

2022/0148219 A1* 5/2022 Kim .......................... G06T 7/11

FOREIGN PATENT DOCUMENTS

| CN | 104778688 A | 7/2015 |
| CN | 109087342 A | 12/2018 |

(Continued)

OTHER PUBLICATIONS

International Search Report dated Feb. 25, 2021 of PCT International Application No. PCT/CN2020/132929.

*Primary Examiner* — Aditya S Bhat
(74) *Attorney, Agent, or Firm* — Qinghong Xu (57) ABSTRACT

A method for processing positioning data of a mobile device is provided, comprising: acquiring a first original point set and a target point set by measuring an object surface with the mobile device; extracting feature points from the first original point set to obtain an original key point set; extracting feature points from the target point set to obtain a target key point set; performing a first registration operation on the original key point set and the target key point set to obtain a first model transformation parameter; transforming the first original point set by the first model transformation parameter to obtain a second original point set; performing a second registration operation on the second original point set and the target point set to obtain a second model transfor-
(Continued)

mation parameter; and acquiring third model transformation parameter based on the first model transformation parameter and the second model transformation parameter.

15 Claims, 6 Drawing Sheets

(51) Int. Cl.
    *G01S 17/89*     (2020.01)
    *G06T 7/33*     (2017.01)

(52) U.S. Cl.
    CPC ...... *G06T 7/74* (2017.01); *G06T 2207/10028* (2013.01)

(58) Field of Classification Search
    USPC .......................................................... 702/152
    See application file for complete search history.

(56) References Cited

FOREIGN PATENT DOCUMENTS

| | | | |
|---|---|---|---|
| CN | 109767463 | A | 5/2019 |
| CN | 109887015 | A | 6/2019 |
| CN | 110175954 | A | 8/2019 |
| EP | 3451291 | A1 | 3/2019 |

\* cited by examiner

PORTABLE DEVICE POSITIONING DATA PROCESSING METHOD AND APPARATUS, DEVICE, AND STORAGE MEDIUM

The present disclosure is a 35 U.S.C. 371 national phase application of PCT International Application No. PCT/CN2020/132929, which is based on the Chinese patent application with the application number of 201911269684.4, the application date of Dec. 11, 2019, and the title of "Method, Device, Equipment and Storage Medium for Processing Positioning Data of Mobile Device", and claims the benefit and priority of the Chinese patent application, the entire contents of which PCT International Application and which Chinese patent application is incorporated by reference into the present disclosure.

TECHNICAL FIELD

The present disclosure relates to the field of computer vision technology, and in particular, to a method, apparatus, device, and readable storage medium for processing positioning data of a mobile device.

BACKGROUND

Computer vision is a science that studies how to make machines "see". Further, it refers to the use of cameras and computers instead of human eyes to identify, track, and measure targets, and further to perform graphics processing so as to make computer processing more suitable for human observation or transmission to instruments for detection. Applying computer vision technology to indoor robot equipment plays an important role in solving problems such as indoor map construction, self-pose estimation, navigation and obstacle avoidance.

The realization of computer vision usually uses physical digitization technology to collect data through measurement methods such as lidar. Restricted by the measurement equipment and environment, the acquisition of complete measurement data on an object surface often requires multiple measurements. Since generally the point cloud data obtained by each measurement only covers a part of the object surface, and there may be translational and rotational dislocations, in order to obtain the point cloud data of the complete object surface, it is necessary to integrate and register these local point cloud data. The point cloud registration algorithm in the related art usually has problems such as slow speed, low accuracy and poor robustness, which may lead to poor real-time performance, low accuracy and poor adaptability when positioning and navigating mobile devices such as indoor robots.

As mentioned above, how to provide a method for processing positioning data with good real-time performance, high precision and strong adaptability has become an urgent problem to be solved.

The above information disclosed in this Background section is only for enhancement of understanding of the background of the present disclosure and therefore it may contain information that does not form the prior art that is already known to a person of ordinary skill in the art.

SUMMARY

The purpose of the present disclosure is to provide a method, device, apparatus and readable storage medium for processing positioning data of a mobile device, to overcome at least to a certain extent disadvantages such as slow speed, low precision and poor robustness of the point cloud registration algorithm in the related art, which may otherwise lead to problems such as poor real-time performance, low accuracy and poor adaptability of mobile devices such as indoor robots when positioning and navigating.

Other features and advantages of the present disclosure will become apparent from the following detailed description, or be learned in part by practice of the present disclosure.

According to an aspect of the present disclosure, a method for processing positioning data of a mobile device is provided, including: acquiring a first original point set and a target point set by measuring an object surface with the mobile device; extracting feature points from the first original point set to obtain an original key point set; extracting feature points from the target point set to obtain a target key point set; performing a first registration operation on the original key point set and the target key point set to obtain a first model transformation parameter; transforming the first original point set by the first model transformation parameter to obtain a second original point set; performing a second registration operation on the second original point set and the target point set to obtain a second model transformation parameter; and acquiring a third model transformation parameter based on the first model transformation parameter and the second model transformation parameter, where the third model transformation parameter is configured to enable the mobile device to obtain data of the object surface for positioning by registration on the first original point set and the target point set.

According to an embodiment of the present disclosure, the performing the first registration operation on the original key point set and the target key point set to obtain the first model transformation parameter includes: acquiring a closest point pair in the original key point set and the target key point set, where the closest point pair includes one original key point in the original key point set and one target key point in the target key point set, and a distance between the one original key point and the one target key point is less than or equal to a first preset threshold; and acquiring the first model transformation parameter based on the closest point pair.

According to an embodiment of the present disclosure, the acquiring the closest point pair in the original key point set and the target key point set includes: acquiring a plurality of closest points in the original key point set and the target key point set; and the acquiring the first model transformation parameter based on the closest point pair includes: acquiring a plurality of candidate model transformation parameters corresponding to the plurality of closest point pairs; for each closest point pair in the plurality of closest point pairs, calculating a transformation error, with respect to the one target key point in the closest point pair, of each of other original key points in the original key point set, except for the one original key point in the closest point pair, after transformation based on the candidate model transformation parameter corresponding to the closest point pair; acquiring the number of the other original key points whose transformation error corresponding to each closest point pair is less than or equal to a second preset threshold; selecting, as the first model transformation parameter, the candidate model transformation parameter corresponding to the closest point pair with the largest number of the other original key points whose transformation error is less than or equal to the second preset threshold.

According to an embodiment of the present disclosure, the extracting the feature points from the first original point set to obtain the original key point set, and the extracting the feature points from the target point set to obtain the target key point set, include: dividing a space formed by the first original point set into a plurality of voxel grids with a first preset side length; calculating the center of gravity of an original point contained in each voxel grid of the plurality of voxel grids with the first preset side length, where a set of the centers of gravity of each voxel grid is the original key point set; dividing a space formed by the first target point set into a plurality of voxel grids with a second preset side length; and calculating the center of gravity of a target point included in each voxel grid of the plurality of voxel grids with the second preset side length, where a set of the centers of gravity of each voxel grid is the target key point set.

According to an embodiment of the present disclosure, the performing the second registration operation on the second original point set and the target point set to obtain the second model transformation parameter includes: calculating a variance on each dimension of each target point in the target point set; selecting the dimension with the largest variance as the registration dimension; constructing the high-dimensional index binary tree in the registration dimension of the target point set; searching for a closest point in the target point set of each second original point in the second original point set by using the high-dimensional index binary tree; calculating the distance between each second original point and the respective closest point respectively; and selecting, as the second model transformation parameter, a model transformation parameter, with respect to a respective closest point, of a second original point in the second original point set with the smallest distance to the respective closest point.

According to an embodiment of the present disclosure, the searching for the closest point in the target point set of each second original point in the second original point set by using the high-dimensional index binary tree includes: querying the high-dimensional index binary tree downward according to a comparison result between each second original point and each node of the high-dimensional index binary tree by starting from a root node of the high-dimensional index binary tree for each second original point, until a leaf node is reached; determining whether a distance between a node on a unqueried branch for each second original point on the high-dimensional index binary tree and the second original point is not less than the leaf node; and if the distance between the node on the unqueried branch and each second original point is smaller than the leaf node, it is determined that the node on the unqueried branch for the second original point is the closest point.

According to an embodiment of the present disclosure, the determining the distance between the node on the unqueried branch for each second original point on the high-dimensional index binary tree and the second original point is not less than the leaf node, includes: sorting each node on the unqueried branch according to closeness of a value of the registration dimension with respect to each second original point to obtain a priority node sequence; and based on the priority node sequence, sequentially querying each node on the unqueried branch for each second original point on the high-dimensional index binary tree, to determine whether a distance between each node on the unqueried branch and the second original point is not less than the leaf node.

According to another aspect of the present disclosure, a device for processing positioning data of a mobile device is provided, including: a data acquisition module, configured to acquire a first original point set and a target point set by measuring an object surface with the mobile device; a feature extraction module, configured to extract feature points from the first original point set to obtain an original key point set, and further configured to extract feature points from the target point set to obtain a target key point set; a first registration module, configured to perform a first registration operation on the original key point set and the target key point set to obtain a first model transformation parameter, and further configured to transform the first original point set by the first model transformation parameter to obtain a second original point set; a second registration module, configured to perform a second registration operation on the second original point set and the target point set to obtain a second model transformation parameter; and a model acquisition module, configured to acquire a third model transformation parameter based on the first model transformation parameter and the second model transformation parameter, where the third model transformation parameter is configured to enable the mobile device to obtain data of the object surface for positioning by registration on the first original point set and the target point set.

According to yet another aspect of the present disclosure, there is provided an apparatus, including: a memory, a processor, and executable instructions stored in the memory and running in the processor, where the processor is configured to execute the executable instructions to implement the method according to any one of the above embodiments.

According to yet another aspect of the present disclosure, there is provided a computer-readable storage medium on which computer-executable instructions are stored, where the computer-executable instructions are configured, when executed by a processor, to implement the method according to any one of the above embodiments.

According to the method for processing positioning data of a mobile device provided by an embodiment of the present disclosure, the first original point set and the target point set are obtained by measuring the object surface with the mobile device, feature points are extracted from the first original point set and the target point set respectively to obtain the original key point set and the target key point set, the first registration operation is performed on the original key point set and the target key point set to obtain the first model transformation parameter, and the first original point set is transformed by the first model transformation parameter to obtain the second original point set. After that, the second registration operation is performed on the second original point set and the target point set to obtain the second model transformation parameter, and the third model transformation parameter is acquired based on the first model transformation parameter and the second model transformation parameter for registration on the first original point set and the target point set, which enables the mobile device to obtain data of the object surface for positioning, thereby improving the processing accuracy of the positioning data of the mobile device to a certain extent.

It is to be understood that the foregoing general description and the following detailed description are exemplary only and do not limit the present disclosure.

BRIEF DESCRIPTION OF THE DRAWINGS

The above and other objects, features and advantages of the present disclosure will become more apparent from the detailed description of example embodiments thereof with reference to the accompanying drawings.

DETAILED DESCRIPTION OF THE EMBODIMENTS

Example embodiments will now be described more fully with reference to the accompanying drawings. Example embodiments, however, may be embodied in various forms and should not be construed as limited to the examples set forth herein. Rather, these embodiments are provided so that the present disclosure will be thorough and complete, and will fully convey the concept of example embodiments to those skilled in the art. The drawings are merely schematic illustrations of the present disclosure and are not necessarily drawn to scale. The same reference numerals in the drawings denote the same or similar parts, and thus their repeated descriptions will be omitted.

Furthermore, the described features, structures, or characteristics may be combined in any suitable way in one or more embodiments. In the following description, numerous specific details are provided in order to give a thorough understanding of embodiments of the present disclosure. However, those skilled in the art will appreciate that the technical solutions of the present disclosure may be practiced without one or more of the specific details, or other methods, devices, steps, etc. may be employed. In other instances, well-known structures, methods, devices, implementations, or operations have not been shown or described in detail to avoid obscuring aspects of the present disclosure.

In addition, the terms "first", "second", etc. are used for descriptive purposes only, and should not be construed as indicating or implying relative importance or implying the number of indicated technical features. Thus, a feature with "first" or "second" ahead may expressly or implicitly include one or more of that feature. In the description of the present disclosure, "plurality" means at least two, such as two, three, etc., unless expressly and specifically defined otherwise. The symbol "/" generally indicates that the related objects are an "or" relationship.

In the present disclosure, unless otherwise expressly specified and limited, terms such as "connection" should be interpreted in a broad sense. For example, it may be an electrical connection or may be a mutual communication. Alternatively, it may be a direct connection or an indirect connection through an intermediate medium. For those of ordinary skill in the art, the specific meanings of the above terms in the present disclosure may be understood according to specific situations.

As mentioned above, the point cloud registration algorithm in the related art usually has problems such as slow speed, low accuracy and poor robustness, which may lead to poor real-time performance, low accuracy and poor adaptability of mobile devices such as indoor robots when positioning and navigating. Therefore, the present disclosure provides a method for processing positioning data of a mobile device. The first original point set and the target point set are acquired by measuring the object surface with the mobile device, and feature points are extracted from the first original point set and the target point set respectively to obtain the original key point set and the target key point set. Further, the first registration operation is performed on the original key point set and the target key point set to obtain the first model transformation parameter, and the first original point set is transformed based on the first model transformation parameter to obtain the second original point set. Then, the second registration operation is performed on the second original point set and the target point set to obtain the second model transformation parameter, and the third model transformation parameter is obtained based on the first model transformation parameter and the second model transformation parameter for registration on the first original point set and the target point set, which enables the mobile device to obtain data of the object surface for positioning, thereby improving the processing accuracy of the positioning data of the mobile device to a certain extent.

Figure 1:
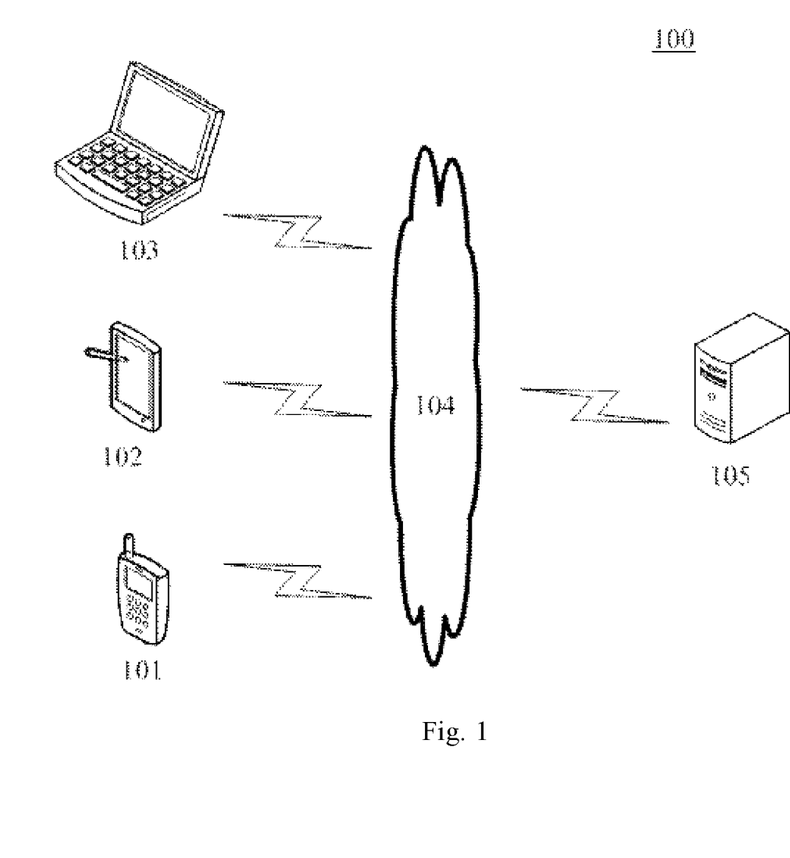
FIG. 1 shows a schematic structural diagram of a system for processing positioning data of a mobile device in an embodiment of the present disclosure.

FIG. 1 shows an exemplary system architecture 100 to which the method for processing positioning data of a mobile device or the device for processing positioning data of a mobile device of the present disclosure may be applied.

As shown in FIG. 1, the system architecture 100 may include terminal devices 101, 102, and 103, a network 104 and a server 105. The network 104 is a medium used to provide a communication link between the terminal devices 101, 102, 103 and the server 105. The network 104 may include various connection types, such as wired, wireless communication links, or fiber optic cables, among others.

A user may use the terminal devices 101, 102, 103 to interact with the server 105 through the network 104 to receive or send messages and the like. Various communication client applications may be installed on the terminal devices 101, 102 and 103, such as a photographing application, an image recognition application, and the like.

The terminal devices 101, 102, 103 may be various electronic devices having a display screen and supporting web browsing, including but not limited to smart phones, tablet computers, laptop computers, desktop computers, and the like.

The server 105 may be a server that provides various services, such as a background management server (just an example) that provides support for image search websites browsed by the user using the terminal devices 101, 102, and 103. The background management server may analyze and process the received initial images and other data, and feed back the image fusion result to the terminal devices.

It should be understood that the numbers of terminal devices, networks and servers in FIG. 1 are merely illustrative. There may be any number of terminal devices, networks and servers according to implementation needs.

Figure 2:
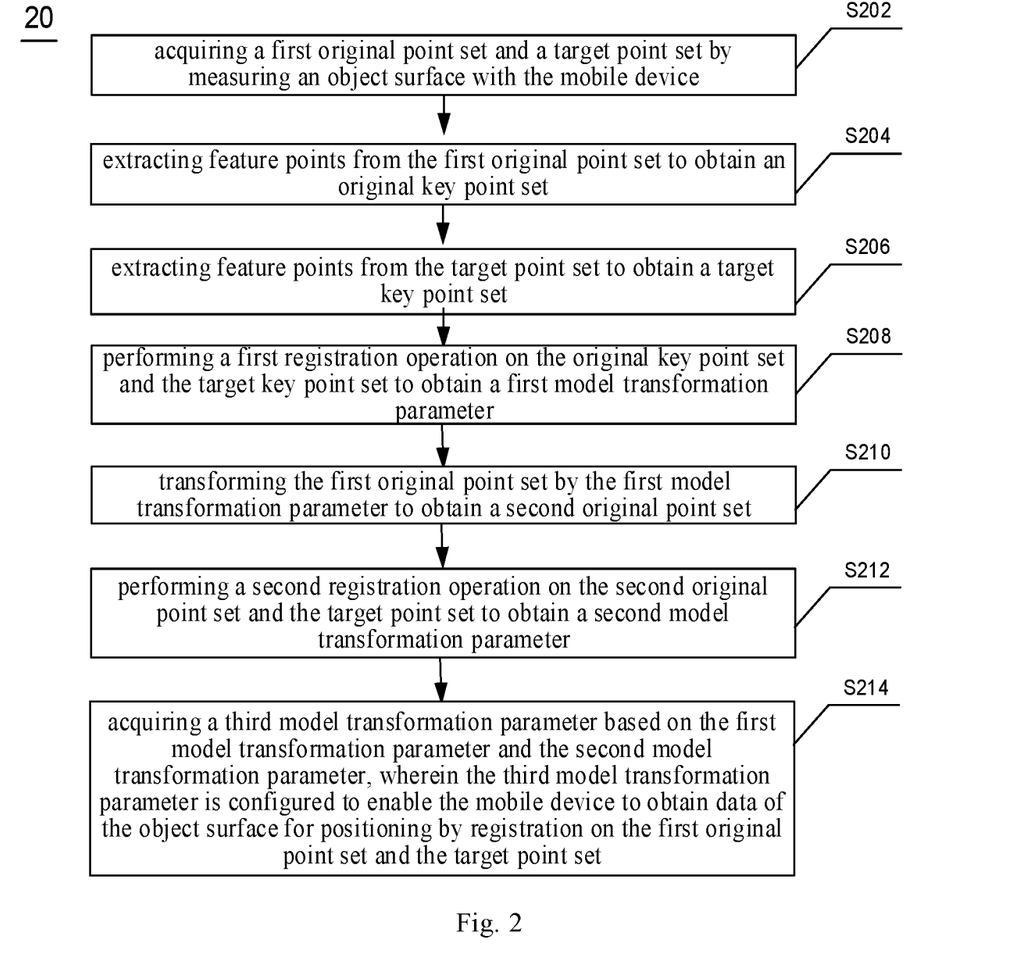
FIG. 2 shows a flowchart of a method for processing positioning data of a mobile device in an embodiment of the present disclosure.

FIG. 2 is a flow chart of a method for processing positioning data of a mobile device according to an exemplary embodiment. The method shown in FIG. 2 may be applied to, for example, the server side of the system for processing positioning data of the mobile device, and may be alternatively applied to the terminal device of the system for processing positioning data of the mobile device.

Referring to FIG. 2, the method 20 provided by an embodiment of the present disclosure may include the following steps S202, S204, S206, S208, S210, S212, and S214.

In step S202, a first original point set and a target point set is acquired by measuring the object surface with the mobile device. Mobile devices include intelligent robots, mobile photographing devices, and the like. The mobile device may use lidar to measure indoor objects to obtain data of the object surface. The first original point set and the target point set are point cloud sets in different coordinate systems obtained by the mobile device measuring the object surface, which may be rotated and translated for registration into the same coordinate system to obtain a more complete point cloud data of the object surface.

In some embodiments, the two point sets that need to be registered may be far apart, and a translation operation may be performed before registration, so as to reduce the calculation amount in searching for the closest point. The translation operation may be performed in the following ways.

Firstly, the following formulas are used to calculate the centers of gravity of the initial point set X and the initial target point set P, i.e., $\mu_x$ and $\mu_p$ respectively:

$$\mu_x = \frac{1}{N_x}\sum_{i=1}^{N_x} x_i \quad (1)$$

$$\mu_p = \frac{1}{N_p}\sum_{j=1}^{N_p} p_j. \quad (2)$$

In the above formulas, $N_x$ is the number of points in the initial point set X, $x_i$ is the coordinate of the i-th point in the initial point set X, i is a positive integer greater than or equal to 1 and less than or equal to $N_x$; $N_p$ is the number of points in the initial target point set P, $p_j$ the coordinate of the j-th point in the initial target point set P, and j is a positive integer greater than or equal to 1 and less than or equal to $N_p$.

Then, the corresponding centers of gravity are subtracted respectively from the points of the initial point set X and the initial target point set P, to obtain the first original point set X' and the target point set P':

$$X' = \{x_i - \mu_x\} = \{x_i'\} \quad (3)$$

$$P' = \{p_j - \mu_p\} = \{p_j'\} \quad (4).$$

In the above formulas, $x_i'$ is the coordinate of the i-th point in the original point set X', and $p_j'$ is the coordinate of the j-th point in the target point set P'.

In step S204, feature points are extracted from the first original point set to obtain an original key point set. Since the acquired data of the object surface is refreshed quickly, if the method of searching for the closest point is used to register the first original point set and the target point set directly, the accuracy will be low due to the slow speed. Therefore, before searching for the closest point of the first original point set and the target point set, rough registration may be performed first based on the key point extraction algorithm to improve the overall registration speed and accuracy.

In step S206, feature points are extracted from the target point set to obtain a target key point set.

In some embodiments, feature points of the point cloud are some points of interest, such as turning points, corner points, and other points or point sets with obvious features of a target. To extract key points from the point cloud, a Scale-Invariant Feature Transform (SIFT) algorithm, an Intrinsic Shape Signatures (ISS) algorithm, etc. may be used as required, which is not limited in the present disclosure.

In step S208, a first registration operation is performed on the original key point set and the target key point set to obtain a first model transformation parameter.

In some embodiments, for each original key point in the original key point set, each target key point in the target key point set is traversed to obtain the closest point pair in the original key point set and the target key point set. The closest point pair includes one original key point in the original key point set and one target key point in the target key point set. The distance between the one original key point and the one target key point is less than or equal to a first preset threshold, which may be expressed as the following formula:

$$\sqrt{\sum_{m=1}^{N_q}\sum_{l=1}^{N_y} \|y_l - q_m\|^2} \le C. \quad (5)$$

In the above formula, $N_y$ is the number of original key points in the original key point set, $y_l$ is the coordinate of the l-th point in the original key point set, l is a positive integer greater than or equal to 1 and less than or equal to $N_y$; number, $N_q$ is the number of target key points in the target key point set, $q_m$ is the coordinate of the m-th point in the target key point set, m is a positive integer greater than or equal to 1 and less than or equal to $N_q$. The first model transformation parameter is then obtained from the closest point pair. The first model transformation parameter may include a rotation parameter and a displacement parameter.

In some embodiments, the following method may be used to obtain the closest point pair in the original key point set and the target key point se. Firstly, for each original key point in the original key point set, the corresponding closest point in the target key point set is obtained by traversing, and multiple closest point pairs in the original key point set and the target key point set are obtained, thereby obtaining multiple candidate model transformation parameters corresponding to the multiple closest point pairs. For each closest point pair in the multiple closest point pairs, the transformation error with respect to the one target key point in the closest point pair is obtained of each of other original key points in the original key point set, except for the one original key point in the closest point pair, after transformation based on the candidate model transformation parameter corresponding to the closest point pair. The transformation error of the original key point may be obtained by subtracting the original key point after transformation based on the model transformation parameter from the corresponding target key point, and then squaring. After that, error of each of the other original key points is added to obtain the transformation error. The number of the other original key points whose transformation error corresponding to each closest point pair is less than or equal to the second preset threshold may be acquired. The candidate model transformation parameter corresponding to the closest point pair with the largest number of the other original key points whose transformation error is less than or equal to the second preset threshold may be selected as the first model transformation parameter.

In step S210, the first original point set is transformed based on the first model transformation parameter to obtain a second original point set. The transformed points obtained by transforming each of the first original points in the first original point set based on the first model transformation parameter are in one-to-one correspondence with the target points in the target point set. After the first model transformation parameter is obtained through rough registration, the first original point set is rotated and translated based on the first model transformation parameter to obtain a second original point set to be finely registered.

In step S212, a second registration operation is performed on the second original point set and the target point set to obtain a second model transformation parameter. Accurate registration generally adopts the Iterative Closest Point (ICP) method. For each point in the second original point set, the closest point in the matching target point set is searched for, to obtain the corresponding rotation parameter R and translation parameter t, and then the total error E(R,t) is calculated by the following formula:

$$E(R, t) = \frac{1}{N_k} \sum_{k=1}^{N_k} \|p'_k - R \cdot x'_k - t\|^2. \quad (6)$$

In the above formula, $x_k' \in X'$, $p_k' \in P'$, $N_k$ are the number of closest point pairs in the closest point pair set, and $N_k$ is a positive integer greater than or equal to 1, less than or equal to $N_x$ and less than or equal to $N_p$, and k is a positive integer greater than or equal to 1 and less than or equal to $N_k$. If the calculated total error is greater than a preset threshold, the second original point set is transformed according to the rotation parameter R and the translation parameter t to obtain an updated second original point set, continuing to search for the closest point in the matching target point set, and repeating the above steps, until the total error is not greater than the preset threshold, thus obtaining the second model transformation parameter.

In some embodiments, the calculation method of the total error may also use the root mean square difference or the like. The above-mentioned condition for stopping the iteration and obtaining the second model transformation parameter may also be that the absolute values of two consecutive root mean square differences are less than a certain tolerance, or may be that the number of iterations has reached a preset number. A method based on singular value decomposition, or a quaternion method, etc. may also be used to make the total error converge. The present disclosure is not limited thereto.

In step S214, a third model transformation parameter is obtained according to the first model transformation parameter and the second model transformation parameter, and the third model transformation parameter is used to enable the mobile device to obtain data of the object surface for positioning by registering the first original point set and the target point set.

According to the method for processing positioning data of a mobile device provided by an embodiment of the present disclosure, the first original point set and the target point set are obtained by measuring the object surface with the mobile device, and feature points are respectively extracted from the first original point set and the target point set to obtain the original key point set and the target key point set. Then, the first registration operation is performed on the original key point set and the target key point set to obtain the first model transformation parameter, and the first original point set is transformed based on the first model transformation parameter to obtain the second original point set. After that, a second registration operation is performed on the second original point set and the target point set to obtain the second model transformation parameter. A third model transformation parameter is obtained based on the first model transformation parameter and the second model transformation parameter for registering the first original point set and the target point set, which enables the mobile device to obtain the data of the object surface for positioning, so that the processing accuracy of the positioning data of the mobile device can be improved to a certain extent.

Figure 3:
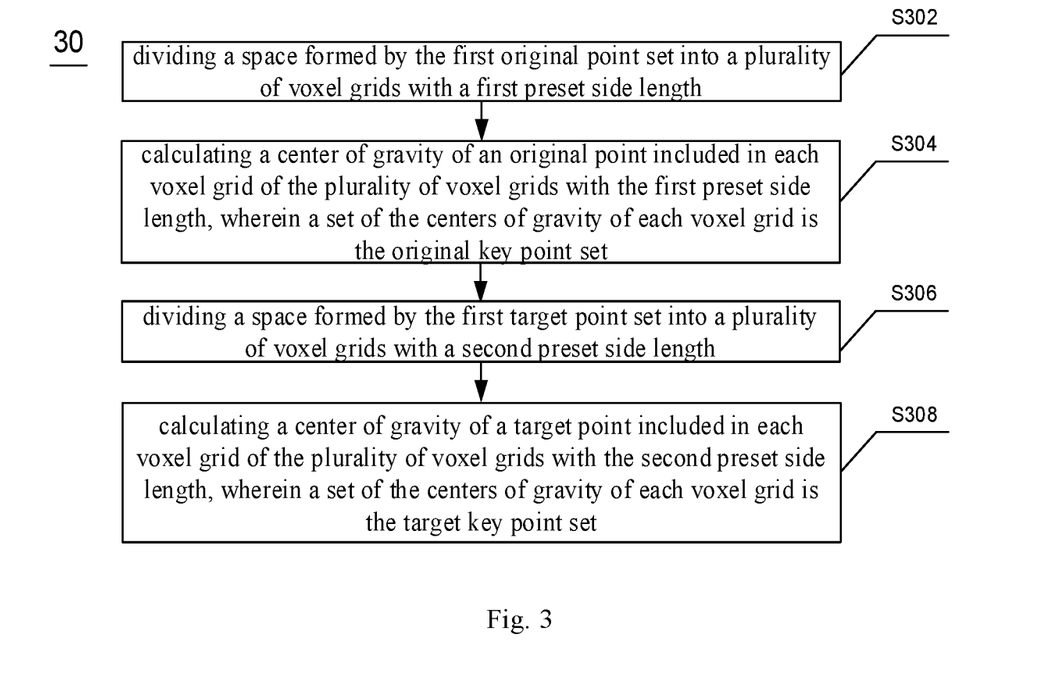
FIG. 3 shows a flowchart of a method for extracting feature points of positioning data of a mobile device in an embodiment of the present disclosure.

FIG. 3 is a flow chart of a method for extracting feature points of positioning data of a mobile device according to an exemplary embodiment. The method shown in FIG. 3 may be applied to, for example, the server side of the system for processing positioning data of a mobile device, and may be alternatively applied to the terminal device of the system for processing positioning data of a mobile device. In step S204 and step S206, this method may be used to extract feature points in the point set.

Referring to FIG. 3, the method 30 provided by an embodiment of the present disclosure may include the following steps S302, S304, S306, and S308.

In step S302, the space formed by the first original point set is divided into a plurality of voxel grids with a first preset side length. For example, for the first original point set consisting of three-dimensional data, it is divided using unit cubes of the same size.

In step S304, the center of gravity of the original point included in each voxel grid of the plurality of voxel grids with the first preset side length is calculated, and the set of the centers of gravity of each voxel grid is the original key point set. The calculation method of the center of gravity refers to formula (1) and formula (2).

In step S306, the space formed by the first target point set is divided into a plurality of voxel grids with a second preset side length. For example, for the first original point set consisting of three-dimensional data, it is divided using unit cubes of the same size.

In step S308, the center of gravity of the target point included in each voxel grid of the plurality of voxel grids with the first preset side length is calculated, and the set of the centers of gravity of each voxel grid is the target key point set. The calculation method of the center of gravity refers to formula (1) and formula (2).

According to the method for extracting feature points of positioning data of a mobile device provided by embodiments of the present disclosure, after dividing the first original point set and the first target point set into voxel grids, the centers of gravity of the points in the voxel grid are selected as the original key point and the target key point, so that the first registration operation is performed on the original key point set and the target key point set to obtain the first model transformation parameter. Thus, the rough registration operation of the positioning data of the mobile device can be realized, and the speed and precision of the fine registration can be improved to a certain extent.

Figure 4:
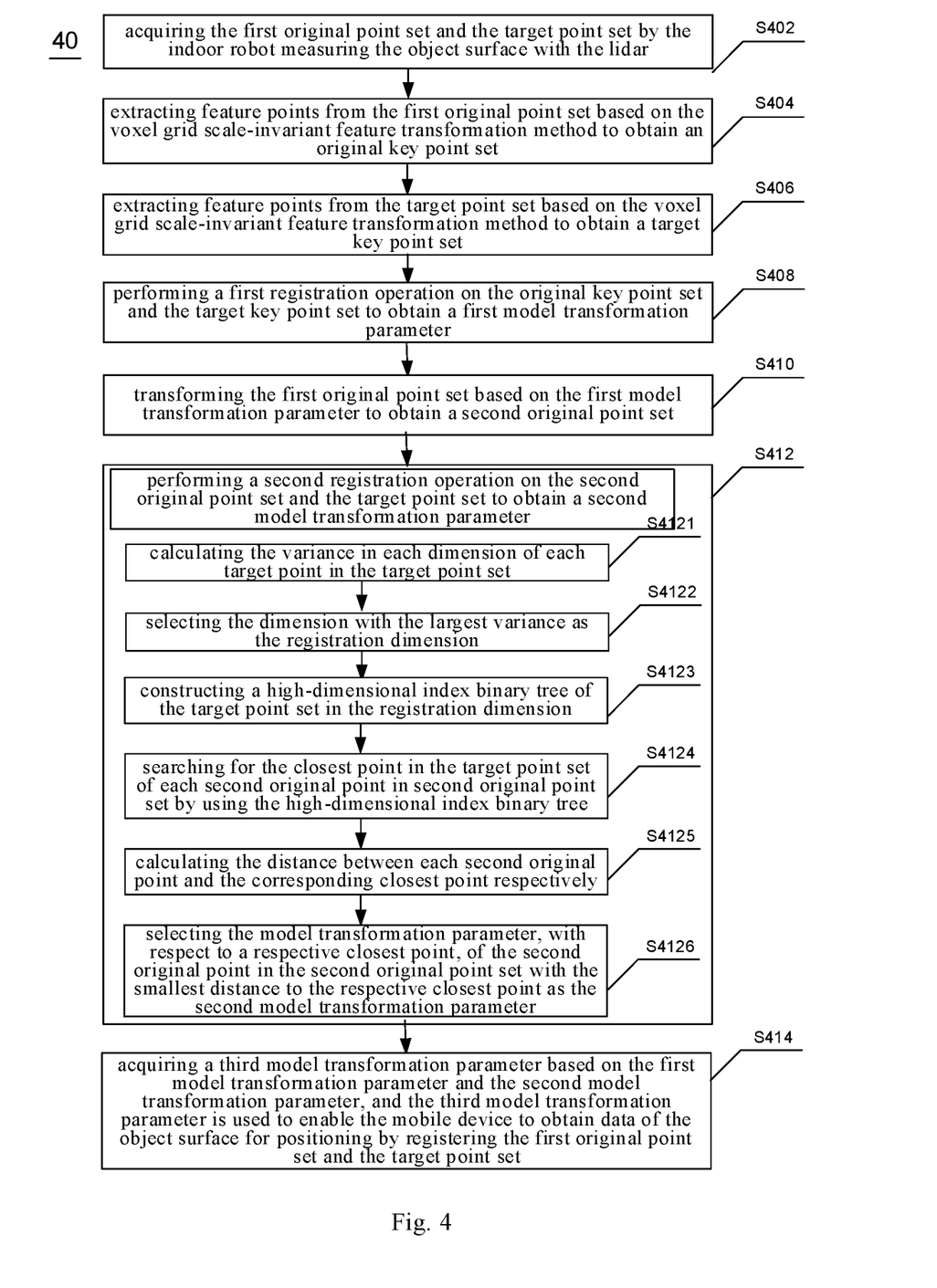
FIG. 4 shows a flowchart of another method for processing positioning data of a mobile device in an embodiment of the present disclosure.

FIG. 4 is a flow chart of a method for processing positioning data of a mobile device according to an exemplary embodiment. The method shown in FIG. 4 may be applied to, for example, the server side of the system for processing positioning data of a mobile device, and may be alternatively applied to the terminal device of the system for processing positioning data of a mobile device.

Referring to FIG. 4, the method 40 provided by an embodiment of the present disclosure may include the following steps S402, S404, S406, S408, S410, S412, and S414.

In step S402, the first original point set and the target point set are obtained by the indoor robot measuring the object surface with the lidar.

In step S404, feature points are extracted from the first original point set based on the voxel grid scale-invariant feature transformation method to obtain an original key point set. Firstly, the first original point set is divided according to the voxel grid division method to create a voxel grid model. Then, each voxel grid model is convolved with a three-dimensional Gaussian filter to obtain the spatial scale of the voxel grid model. The spatial scale model of the each voxel grid model is subtracted by the original model itself to establish a Gaussian difference model. This can ensure that the voxel grid has scale invariance related to it. A weighted histogram is built for the 3D neighborhood around the given extreme points and finally the original key point set is generated.

In step S406, similar to step S404, feature points are extracted from the target point set based on the voxel grid scale-invariant feature transformation method to obtain a target key point set.

In step S408, a first registration operation is performed on the original key point set and the target key point set to obtain a first model transformation parameter.

In step S410, the first original point set is transformed based on the first model transformation parameter to obtain a second original point set.

For some implementations of steps S408 to S410, reference may be made to steps S208 to S210, which will not be repeated here.

In step S412, a second registration operation is performed on the second original point set and the target point set to obtain a second model transformation parameter.

In some embodiments, in step S4121, the variance in each dimension of each target point in the target point set is calculated.

In step S4122, the dimension with the largest variance is selected as the registration dimension.

In step S4123, a high-dimensional index binary tree of the target point set in the registration dimension is constructed. The high-dimensional index binary tree (K-Dimensional Tree, KD Tree) is a data structure that divides high-dimensional data space, and is mainly used for Nearest Neighbor and Approximate Nearest Neighbor of key data in multi-dimensional space. KD Tree is a variant of Binary Search Tree (BST). The properties of a binary search tree are as follows. If its left subtree is not empty, the value of all nodes on the left subtree is less than the value of its root node. If its right subtree is not empty, then the value of all nodes on the right subtree is greater than the value of its root node. Its left and right subtrees are also binary sort trees. The construction method of Kd-Tree is as follows. The dimension with the largest variance is selected in the K-dimensional data set, and then the median (arithmetic mean) on this dimension is selected as the dividing point to divide the K-dimensional data set so as to obtain two subsets. In the meanwhile, a tree node is created for storage. Then, the process of selecting the median and dividing in the previous step is repeated for the two subsets, until all the subsets can no longer be divided.

In step S4124, the closest point in the target point set of each second original point in the second original point set is searched for by using the high-dimensional index binary tree. Firstly, it is started from the root node of the high-dimensional index binary tree (i.e., the first division point) for each second original point, and the high-dimensional index is queried downward according to the comparison result between each second original point and each node of the high-dimensional index binary tree, until a leaf node is reached (that is, the node that cannot be further divided down, and the upper-level node has only this node in the branch subset). Then, a backtracking operation is performed to determine whether the distance between the node of the unqueried branch for each second original point on the high-dimensional index binary tree and the second original point is not less than the leaf node. The nodes on the unqueried branch are sorted according to the closeness of the value of the registration dimension with respect to each second original point, that is, according to the absolute value of the difference between the value of the second original point and the unqueried node in the registration dimension. The smaller the absolute value, the more ahead the sorting. The, the priority node sequence is obtained. Each node on the unqueried branch of each second original point on the high-dimensional index binary tree is queried in turn according to the priority node sequence, and it is determined whether the distance between each node on the unqueried branch and each of the second original points is not less than the leaf node. If the distance between the node on the unqueried branch and each of the second original points is smaller than the leaf node, it is determined that the node on the unqueried branch for each of the second original points is the closest point.

In step S4125, the distance between each second original point and the corresponding closest point is calculated respectively.

In step S4126, the model transformation parameter, with respect to a respective closest point, of the second original point in the second original point set with the smallest distance to the respective closest point is selected as the second model transformation parameter. The second model transformation parameter can be obtained by an iterative closest point method, see some embodiments about step S212, and details are not repeated here.

In step S414, a third model transformation parameter is obtained based on the first model transformation parameter and the second model transformation parameter, and the third model transformation parameter is used to enable the mobile device to obtain data of the object surface for positioning by registering the first original point set and the target point set.

According to the method for processing positioning data of a mobile device provided by an embodiment of the present disclosure, the first original point set and the target point set are obtained by measuring the object surface with the lidar. A method based on the voxel scale-invariant feature transformation is used to extract feature points from the first original point set and the target point set, respectively, to obtain the original key point set and the target key point set. The first registration operation is performed on the original key point set and the target key point set to obtain the first model transformation parameter. The first original point set is transformed by the first model transformation parameter to obtain the second original point set. Then, the K-D Tree method is used to perform the second registration operation on the second original point set and the target point set, to obtain the second model transformation parameter. A third model transformation parameter is obtained based on the first model transformation parameter and the second model transformation parameter for registering the first original point set and the target point set, which enables the mobile device to obtain the data of the object surface for positioning, so that accuracy and robustness for processing the positioning data of the mobile device can be improved to a certain extent.

Figure 5:
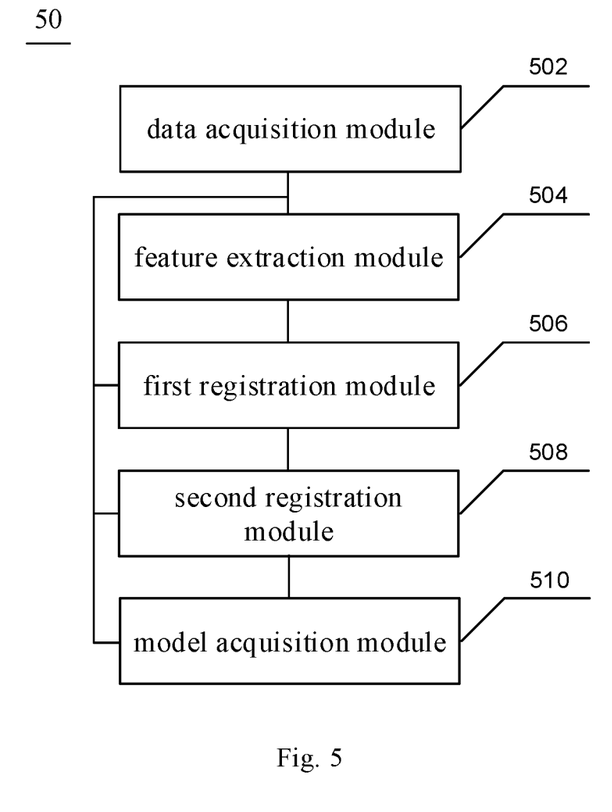
FIG. 5 shows a block diagram of an apparatus for processing positioning data of a mobile device in an embodiment of the present disclosure.

FIG. 5 is a flow chart of an apparatus for processing positioning data of a mobile device according to an exemplary embodiment. The apparatus shown in FIG. 5 may be applied to, for example, the server side of the system for processing positioning data of a mobile device, and may be alternatively applied to the terminal device of the system for processing positioning data of a mobile device.

Referring to FIG. 5, the apparatus 50 provided by an embodiment of the present disclosure may include: a data acquisition module 502, a feature extraction module 504, a first registration module 506, a second registration module 508, and a model acquisition module 510.

The data acquisition module 502 may be used to acquire the first original point set and the target point set by measuring the object surface with the mobile device.

The feature extraction module 504 may be used to extract feature points from the first original point set to obtain the original key point set.

The feature extraction module 504 may also be used to extract feature points from the target point set to obtain the target key point set.

The first registration module 506 may be configured to perform a first registration operation on the original key point set and the target key point set to obtain a first model transformation parameter.

The first registration module 506 may also be configured to transform the first original point set based on the first model transformation parameter to obtain the second original point set.

The second registration module 508 may be configured to perform a second registration operation on the second original point set and the target point set to obtain a second model transformation parameter.

The model obtaining module 510 may be configured to obtain a third model transformation parameter according to the first model transformation parameter and the second model transformation parameter, and the third model transformation parameter is used to enable the mobile device to obtain data of the object surface for positioning by registering the first original point set and the target point set.

The first registration module 506 may also be used to obtain the closest point pair in the original key point set and the target key point set, where the closest point pair includes one original key point in the original key point set and one target key point in the target key point set, and the distance between the one original key point and the one target key point is less than or equal to the first preset threshold. The first model transformation parameter is obtained according to the closest point pair.

The first registration module 506 may also be used to obtain multiple closest point pairs in the original key point set and the target key point set; and to obtain multiple candidate model transformation parameters corresponding to multiple closest point pairs. For each closest point pair, a transformation error, with respect to the one target key point in the closest point pair, is calculated of each of other original key points in the original key point set, except for the one original key point in the closest point pair, after transformation based on a candidate model transformation parameter corresponding to the closest point pair. Further, the number of the other original key points whose transformation error corresponding to each closest point pair is less than or equal to a second preset threshold is acquired. Then, a candidate model transformation parameter corresponding to the closest point pair with the largest number of the other original key points whose transformation error is less than or equal to the second preset threshold is selected as the first model transformation parameter.

The feature extraction module 504 may also be used to divide the space formed by the first original point set into a plurality of voxel grids with a first preset side length; and to calculate the center of gravity of the original point contained in each voxel grid of the plurality of voxel grids with the first preset side length, where the set of the centers of gravity of each voxel grid is the original key point set. Further, the space formed by the first target point set is divided into a plurality of voxel grids with a second preset side length. The center of gravity of the target point included in each voxel grid of the voxel grids with the second preset side length is calculated, and the set of the centers of gravity of each voxel grid is the target key point set.

The second registration module 508 may also be used to calculate the variance in each dimension of each target point in the target point set; select the dimension with the largest variance as the registration dimension; construct a high-dimensional index binary tree of the target point set in the registration dimension; search for the closest point in the target point set of each second original point in the second original point set by using the high-dimensional index binary tree; calculates the distance between each second original point and the corresponding closest point respectively; and select, as the second model transformation parameter, the model transformation parameter, with respect to the respective closest point, of the second original point in the second original point set with the smallest distance to the respective closest point.

The second registration module 508 may also be configured to start from the root node of the high-dimensional index binary tree for each second original point, and query the high-dimensional index binary tree downward according to the comparison result between each second original point and each node of the high-dimensional index binary tree, until the leaf node is reached; determine whether the distance between the node of the unqueried branch for each second original point on the high-dimensional index binary tree and the second original point is not less than the leaf node; and if the distance between the node on the unqueried branch and each second original point is smaller than the leaf node, then it is determined that the node of the unqueried for each second original point is the closest point.

The second registration module 508 may also be configured to sort each node of the unqueried branch according to the closeness of the value of the registration dimension with respect to each second original point to obtain a priority node sequence; and according to the priority node sequence, sequentially query each node of the unqueried branch for each second original point on the high-dimensional index binary tree, to determine whether the distance between each node of the unqueried branch and the second original point is not less than the leaf node.

Figure 6:
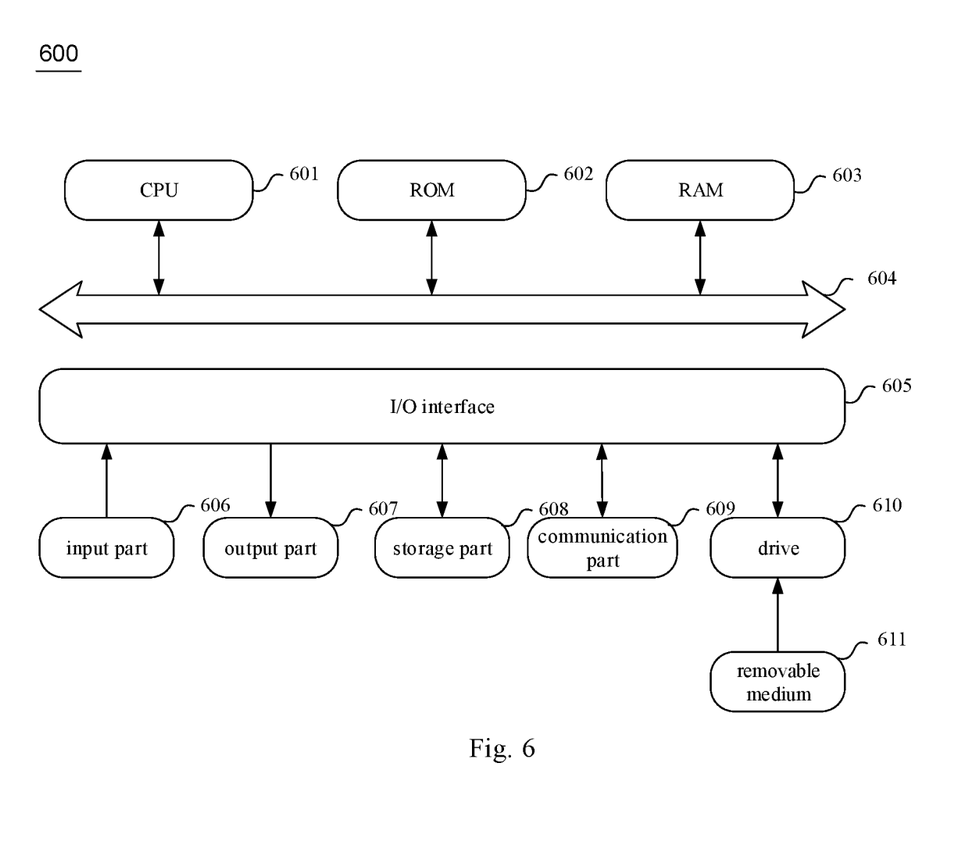
FIG. 6 shows a schematic structural diagram of an electronic device in an embodiment of the present disclosure.

FIG. 6 is a block diagram of an electronic device that can be used in the system for processing positioning data of a mobile device according to an exemplary embodiment. It should be noted that the device shown in FIG. 6 is only an example of a computer system, and should not impose any limitations on the functions and scope in use of embodiments of the present disclosure.

As shown in FIG. 6, the apparatus 600 includes a central processing unit (CPU) 601, which can be used to perform various appropriate actions and processes according to a program stored in a read only memory (ROM) 602 or a program loaded from a storage part 608 into a random access memory (RAM) 603. In the RAM 603, various programs and data necessary for operations of the apparatus 600 are also stored. The CPU 601, the ROM 602, and the RAM 603 are connected to each other through a bus 604. An input/output (I/O) interface 605 is also connected to bus 604.

The following components are connected to the I/O interface 605: an input part 606 including a keyboard, a mouse, etc.; an output part 607 including a cathode ray tube (CRT), a liquid crystal display (LCD), and a speaker, etc.; a storage part 608 including a hard disk, etc.; and a communication part 609 including a network interface card such as a LAN card, a modem, and the like. The communication part 609 performs communication processing via a network such as the Internet. A drive 610 is also connected to the I/O interface 605 as needed. A removable medium 611, such as a magnetic disk, an optical disk, a magneto-optical disk, a semiconductor memory, etc., is mounted on the drive 610 as needed, so that a computer program read therefrom is installed into the storage part 608 as needed.

In particular, according to embodiments of the present disclosure, the processes described above with reference to the flowcharts may be implemented as computer software programs. For example, embodiments of the present disclosure include a computer program product comprising a computer program carried on a computer-readable medium. The computer program contains program code for performing the method illustrated in the flowchart. In such an embodiment, the computer program may be downloaded and installed from the network via the communication part 609 and/or installed from the removable medium 611. When the computer program is executed by the central processing unit (CPU) 601, the above-described functions defined in the system of the present disclosure are executed.

It should be noted that the computer-readable medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In the present disclosure, a computer-readable storage medium may be any tangible medium that contains or stores a program that can be used by or in conjunction with an instruction execution system, apparatus, or device. In the present disclosure, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, wireless, wireline, optical fiber cable, RF, etc., or any suitable combination of the foregoing.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code that contains one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams or flowchart illustrations, and combinations of blocks in the block diagrams or flowchart illustrations, can be implemented in dedicated hardware-based systems that perform the specified functions or operations, or can be implemented using a combination of dedicated hardware and computer instructions.

The modules involved in embodiments of the present disclosure may be implemented in software or hardware. The described modules can also be provided in a processor. For example, it may be described as follows. The processor includes a data acquisition module, a feature extraction module, a first registration module, a second registration module and a model acquisition module. Names of these modules do not constitute a limitation of each module itself under certain circumstances. For example, the data acquisition module can also be described as "a module for acquiring point set data from the connected server".

As another aspect, the present disclosure also provides a computer-readable medium. The computer-readable medium may be included in the device described in the above-mentioned embodiments, or it may exist alone without being assembled into the device. The above-mentioned computer-readable medium carries one or more programs. When the above-mentioned one or more programs are executed by a device, the device is enabled to: acquire a first original point set and a target point set by measuring the object surface with a mobile device; extract feature points from the first original point set to obtain the original key point set; extract feature points from the target point set to obtain the target key point set; perform the first registration operation on the original key point set and the target key point set to obtain the first model transformation parameter; transform the first original point set by the first model transformation parameter to obtain the second original point set; perform the second registration operation on the second original point set and the target point set to obtain the second model transformation parameter; and obtain a third model transformation parameter according to the first model transformation parameter and the second model transformation parameter, where the third model transformation parameter is used to enable the mobile device to obtain the data of the object surface for positioning by registering the first original point set and the target point set.

Exemplary embodiments of the present disclosure have been specifically shown and described above. It should be understood that the present disclosure is not limited to the details of construction, arrangements, or implementations described herein. On the contrary, the present disclosure is intended to cover various modifications and equivalent arrangements included within the spirit and scope of the appended claims.

The invention claimed is:

1. A method for processing positioning data of a mobile device, comprising:
   acquiring a first original point set and a target point set by measuring an object surface with the mobile device;
   extracting feature points from the first original point set to obtain an original key point set;
   extracting feature points from the target point set to obtain a target key point set;
   performing a first registration operation on the original key point set and the target key point set to obtain a first model transformation parameter;
   transforming the first original point set by the first model transformation parameter to obtain a second original point set;
   performing a second registration operation on the second original point set and the target point set to obtain a second model transformation parameter; and
   acquiring a third model transformation parameter based on the first model transformation parameter and the second model transformation parameter, wherein the third model transformation parameter is configured to enable the mobile device to obtain data of the object surface for positioning by registration on the first original point set and the target point set.

2. The method according to claim 1, wherein, said performing the first registration operation on the original key point set and the target key point set to obtain the first model transformation parameter, comprises:
   acquiring a closest point pair in the original key point set and the target key point set, wherein the closest point pair comprises one original key point in the original key point set and one target key point in the target key point set, and a distance between the one original key point and the one target key point is less than or equal to a first preset threshold; and
   acquiring the first model transformation parameter based on the closest point pair.

3. The method according to claim 2, wherein
   said acquiring the closest point pair in the original key point set and the target key point set, comprises:
   acquiring a plurality of closest point pairs in the original key point set and the target key point set; and
   said acquiring the first model transformation parameter based on the closest point pair, comprises:
   acquiring a plurality of candidate model transformation parameters corresponding to the plurality of closest point pairs;
   for each closest point pair in the plurality of closest point pairs, calculating a transformation error, with respect to the one target key point in the closest point pair, of each of other original key points in the original key point set, except for the one original key point in the closest point pair, after transformation based on a candidate model transformation parameter corresponding to the closest point pair;
   acquiring a number of the other original key points whose transformation error corresponding to each closest point pair is less than or equal to a second preset threshold; and
   selecting, as the first model transformation parameter, a candidate model transformation parameter corresponding to the closest point pair with the largest number of the other original key points whose transformation error is less than or equal to the second preset threshold.

4. The method according to claim 1, wherein, said extracting the feature points from the first original point set to obtain the original key point set, and said extracting the feature points from the target point set to obtain the target key point set, comprises:
   dividing a space formed by the first original point set into a plurality of voxel grids with a first preset side length;
   calculating a center of gravity of an original point included in each voxel grid of the plurality of voxel grids with the first preset side length, wherein a set of the centers of gravity of each voxel grid is the original key point set;
   dividing a space formed by the first target point set into a plurality of voxel grids with a second preset side length; and
   calculating a center of gravity of a target point included in each voxel grid of the plurality of voxel grids with the second preset side length, wherein a set of the centers of gravity of each voxel grid is the target key point set.

5. The method according to claim 1, wherein, said performing the second registration operation on the second original point set and the target point set to obtain the second model transformation parameter, comprises:
   calculating a variance in each dimension of each target point in the target point set;
   selecting a dimension with the largest variance as a registration dimension;
   constructing a high-dimensional index binary tree in the registration dimension of the target point set;
   searching for a closest point in the target point set of each second original point in the second original point set by using the high-dimensional index binary tree;
   calculating a distance between each second original point and a respective closest point; and
   selecting, as the second model transformation parameter, a model transformation parameter, with respect to a respective closest point, of a second original point in the second original point set with the smallest distance to the respective closest point.

6. The method according to claim 5, wherein, said searching for the closest point in the target point set of each second original point in the second original point set by using the high-dimensional index binary tree, comprises:
   querying the high-dimensional index binary tree downward according to a comparison result between each second original point and each node of the high-dimensional index binary tree by starting from a root node of the high-dimensional index binary tree for each second original point, until a leaf node is reached;
   determining whether a distance between a node on a unqueried branch for each second original point on the high-dimensional index binary tree and the second original point is not less than the leaf node; and
   if the distance between the node on the unqueried branch and each second original point is smaller than the leaf node, it is determined that the node on the unqueried branch for the second original point is the closest point.

7. The method according to claim 6, wherein, said determining the distance between the node on the unqueried branch for each second original point on the high-dimensional index binary tree and the second original point is not less than the leaf node, comprises:

sorting each node on the unqueried branch according to closeness of a value of the registration dimension with respect to each second original point to obtain a priority node sequence; and based on the priority node sequence, sequentially querying each node on the unqueried branch for each second original point on the high-dimensional index binary tree, to determine whether a distance between each node on the unqueried branch and the second original point is not less than the leaf node.

8. An apparatus, comprising: a memory, a processor, and executable instructions stored in the memory and running in the processor, wherein the processor is configured to execute the executable instructions to implement a method for processing positioning data of a mobile device, comprising:

acquiring a first original point set and a target point set by measuring an object surface with the mobile device;

extracting feature points from the first original point set to obtain an original key point set;

extracting feature points from the target point set to obtain a target key point set;

performing a first registration operation on the original key point set and the target key point set to obtain a first model transformation parameter;

transforming the first original point set by the first model transformation parameter to obtain a second original point set;

performing a second registration operation on the second original point set and the target point set to obtain a second model transformation parameter; and acquiring a third model transformation parameter based on the first model transformation parameter and the second model transformation parameter, wherein the third model transformation parameter is configured to enable the mobile device to obtain data of the object surface for positioning by registration on the first original point set and the target point set.

9. The apparatus according to claim 8, wherein, said performing the first registration operation on the original key point set and the target key point set to obtain the first model transformation parameter, comprises:

acquiring a closest point pair in the original key point set and the target key point set, wherein the closest point pair comprises one original key point in the original key point set and one target key point in the target key point set, and a distance between the one original key point and the one target key point is less than or equal to a first preset threshold; and acquiring the first model transformation parameter based on the closest point pair.

10. The apparatus according to claim 9, wherein said acquiring the closest point pair in the original key point set and the target key point set, comprises:

acquiring a plurality of closest point pairs in the original key point set and the target key point set; and said acquiring the first model transformation parameter based on the closest point pair, comprises:

acquiring a plurality of candidate model transformation parameters corresponding to the plurality of closest point pairs;

for each closest point pair in the plurality of closest point pairs, calculating a transformation error, with respect to the one target key point in the closest point pair, of each of other original key points in the original key point set, except for the one original key point in the closest point pair, after transformation based on a candidate model transformation parameter corresponding to the closest point pair;

acquiring a number of the other original key points whose transformation error corresponding to each closest point pair is less than or equal to a second preset threshold; and selecting, as the first model transformation parameter, a candidate model transformation parameter corresponding to the closest point pair with the largest number of the other original key points whose transformation error is less than or equal to the second preset threshold.

11. The apparatus according to claim 8, wherein, said extracting the feature points from the first original point set to obtain the original key point set, and said extracting the feature points from the target point set to obtain the target key point set, comprises:

dividing a space formed by the first original point set into a plurality of voxel grids with a first preset side length;

calculating a center of gravity of an original point included in each voxel grid of the plurality of voxel grids with the first preset side length, wherein a set of the centers of gravity of each voxel grid is the original key point set;

dividing a space formed by the first target point set into a plurality of voxel grids with a second preset side length; and calculating a center of gravity of a target point included in each voxel grid of the plurality of voxel grids with the second preset side length, wherein a set of the centers of gravity of each voxel grid is the target key point set.

12. The apparatus according to claim 8, wherein, said performing the second registration operation on the second original point set and the target point set to obtain the second model transformation parameter, comprises:

calculating a variance in each dimension of each target point in the target point set;

selecting a dimension with the largest variance as a registration dimension;

constructing a high-dimensional index binary tree in the registration dimension of the target point set;

searching for a closest point in the target point set of each second original point in the second original point set by using the high-dimensional index binary tree;

calculating a distance between each second original point and a respective closest point; and selecting, as the second model transformation parameter, a model transformation parameter, with respect to a respective closest point, of a second original point in the second original point set with the smallest distance to the respective closest point.

13. The apparatus according to claim 12, wherein, said searching for the closest point in the target point set of each second original point in the second original point set by using the high-dimensional index binary tree, comprises:

querying the high-dimensional index binary tree downward according to a comparison result between each second original point and each node of the high-dimensional index binary tree by starting from a root node of the high-dimensional index binary tree for each second original point, until a leaf node is reached;

determining whether a distance between a node on a unqueried branch for each second original point on the high-dimensional index binary tree and the second original point is not less than the leaf node; and if the distance between the node on the unqueried branch and each second original point is smaller than the leaf node, it is determined that the node on the unqueried branch for the second original point is the closest point.

14. The apparatus according to claim 13, wherein, said determining the distance between the node on the unqueried branch for each second original point on the high-dimensional index binary tree and the second original point is not less than the leaf node, comprises:
   sorting each node on the unqueried branch according to closeness of a value of the registration dimension with respect to each second original point to obtain a priority node sequence; and
   based on the priority node sequence, sequentially querying each node on the unqueried branch for each second original point on the high-dimensional index binary tree, to determine whether a distance between each node on the unqueried branch and the second original point is not less than the leaf node.

15. A computer-readable storage medium, having computer-executable instructions stored thereon, wherein the computer-executable instructions are configured, when executed by a processor, to implement a method for processing positioning data of a mobile device, comprising:
   acquiring a first original point set and a target point set by measuring an object surface with the mobile device;
   extracting feature points from the first original point set to obtain an original key point set;
   extracting feature points from the target point set to obtain a target key point set;
   performing a first registration operation on the original key point set and the target key point set to obtain a first model transformation parameter;
   transforming the first original point set by the first model transformation parameter to obtain a second original point set;
   performing a second registration operation on the second original point set and the target point set to obtain a second model transformation parameter; and
   acquiring a third model transformation parameter based on the first model transformation parameter and the second model transformation parameter, wherein the third model transformation parameter is configured to enable the mobile device to obtain data of the object surface for positioning by registration on the first original point set and the target point set.

* * * * *